(12) United States Patent
Pontius et al.

(10) Patent No.: US 8,078,948 B2
(45) Date of Patent: Dec. 13, 2011

(54) TWO-PHASE DATA-TRANSFER PROTOCOL

(75) Inventors: Timothy Pontius, Crystal Lake, IL (US);
Jens Roever, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 812 days.

(21) Appl. No.: 11/576,345

(22) PCT Filed: Sep. 28, 2005

(86) PCT No.: PCT/IB2005/053207
§ 371 (c)(1),
(2), (4) Date: May 30, 2008

(87) PCT Pub. No.: WO2006/035410
PCT Pub. Date: Apr. 6, 2006

(65) Prior Publication Data
US 2008/0270875 A1 Oct. 30, 2008

Related U.S. Application Data

(60) Provisional application No. 60/614,391, filed on Sep. 29, 2004.

(51) Int. Cl.
*G06F 11/00* (2006.01)
(52) U.S. Cl. ...................................................... 714/798
(58) Field of Classification Search .................. 714/746, 714/775, 789, 798–799; 709/223; 706/10
See application file for complete search history.

(56) References Cited

U.S. PATENT DOCUMENTS

| 6,154,803 | A | 11/2000 | Pontius |
| 6,745,363 | B2 * | 6/2004 | Poirier et al. ................. 714/763 |
| 6,999,542 | B1 * | 2/2006 | Korger et al. ................. 375/354 |

OTHER PUBLICATIONS

Jacobs et al: "A Fully Asynchronous Digital Signal Processor Using Self-Timed Circuits"; IEEE Journal of Solid-State Circuits; vol. 25 No. 6; Dec. 1990; pp. 1526-1537.
Furber et al: "Amulet3: A 100 MIPS Asynchronous Embedded Processor"; IEEE Computer Design 2000 International Conf.; Sep. 17-20, 2000; pp. 329-334.

* cited by examiner

*Primary Examiner* — Shelly A Chase

(57) ABSTRACT

A data communication arrangement permits efficient data transfer between a controller module and multiple target modules using a two-phase protocol. The controller module and the target modules can each reside in separate clock domains. Consistent with one example embodiment, a data communication arrangement includes a plurality of target modules, and a first XOR tree arranged to provide a first data integrity-indicating signal and to respond to a respective second data integrity-indicating signal from each of the target modules. A second XOR tree is arranged to provide a first data bus and to respond to a respective second data bus from each of the target modules. Also, a controller module is used to determine availability of data on the first data bus in response to the first data integrity-indicating signal.

17 Claims, 5 Drawing Sheets

TWO-PHASE DATA-TRANSFER PROTOCOL

The present invention is directed generally to data communication. More particularly, the present invention relates to methods and arrangements for data transfer using a two-phase handshaking protocol.

Ongoing demands for more-complex circuits have led to significant achievements that have been realized through the fabrication of very large-scale integration of circuits on small areas of silicon wafer. These complex circuits are often designed as a set of functionally-defined modules that process data and then transfer the processed data to other modules for further processing. This communication between functionally-defined modules can pass small or large amounts of data between modules within the same integrated circuit or between more remotely-located communication circuit arrangements and systems. Regardless of the configuration, the communication typically requires closely controlled interfaces to insure that data integrity is maintained and that integrated circuit designs are sensitive to practicable limitations in terms of implementation space and available operating power.

With the increased complexity of circuits, there has been a commensurate demand for increasing the speed at which data is passed between the modules. Many of these high-speed communication applications can be implemented using parallel data interconnect transmission in which multiple data bits are simultaneously sent across parallel communication paths. Such "parallel bussing" is a well-accepted approach for achieving data transfers at high data rates.

A typical system might include a number of modules that interface to and communicate over a parallel data bus, for example, in the form of an internal bus on an integrated circuit, a cable, and/or other interconnect. A transmitting module transmits data over the bus synchronously with a clock on the transmitting module. In this manner, the transitions on the parallel signal lines leave the transmitting module in a synchronous relationship to each other and to a clock on the transmitting module. At a remote end of the parallel data interconnect, a receiving module receives the data on a parallel data bus. In such systems, the received signals should have a specific phase relationship with a clock on the receiving module in order to provide proper data recovery.

Many integrated circuits include more than one clock domain; therefore a data-transmitting module might be operating in one clock domain at a first clock frequency, while a data-receiving module is operating in another clock domain at a different second clock frequency. Multiple clock domains may also occur for a data-transmitting module and a data receiving operating at the same clock frequency, but having an unknown phase relationship. The interface between clock domains is a clock domain boundary, or a clock domain crossing where information crosses the boundary.

Where transmitting and receiving modules reside in different clock domains, synchronization is required to maintain the integrity of data transferred across the clock domain boundary. A handshaking protocol or intermediate buffers may be used to implement the required synchronization at the clock domain crossing. Synchronization buffers are conventionally used for point-to-point communication between two clock domains, such as illustrated in U.S. Pat. No. 6,154,803, "Method and Arrangement for Passing Data between a Reference Chip and an External Bus". A handshaking protocol can be used for synchronization of a parallel bus between more than two clock domains corresponding to multiple modules interfacing with the parallel bus. However, the conventional handshaking protocol in such an environment is a four-phase handshake protocol that limits the possible data transfer rate.

Implementing integrated circuits using a plurality of clock domains is desirable for a variety of reasons, for example, the device control and status network (DCS network) from Philips Semiconductors permits a controller to communicate with multiple peripherals, with each peripheral potentially having a separate clock source. Accordingly, improving data communication over parallel busses between clock domains permit more practicable and higher-speed parallel bussing applications which, in turn, can directly lead to serving the demands for high-speed circuits. Various aspects of the present invention address the above-mentioned deficiencies and also provide for communication methods and arrangements that are useful for other applications as well.

Various aspects of the present invention are directed to data transfer in a manner that addresses and overcomes the above-mentioned issues. Consistent with one example embodiment, a data communication arrangement includes a plurality of target modules, and a first XOR tree arranged to provide a first data integrity-indicating signal and to respond to a respective second data integrity-indicating signal from each of the target modules. A second XOR tree is arranged to provide a first data bus and to respond to a respective second data bus from each of the target modules. Also, a controller module is used to determine availability of data on the first data bus in response to the first data integrity-indicating signal.

Another embodiment of the present invention discloses a method for the transferring a first data value associated with a read operation. The read operation is produced and identifies one of a plurality of target modules. The first data value is produced by the identified target module. A respective second data value is generated by each of the target modules, with the second data value modified for the identified target module by an exclusive-or operation between the first data value and a previous second data value, and with the second data value remaining unmodified for the target modules besides the identified target module. A respective first validation value is also generated by each of the target modules, with the first validation value modified for the identified target module, and the first validation value remaining unmodified for the target modules besides the identified target module. An exclusive or operation generates a second validation value from the first validation values. The availability of the first data value is determined from a modification of the second validation value. An exclusive-or operation generates a third data value from the second data values. The first data value is determined by an exclusive-or operation between the third data value and a previous third data value.

The invention may be more completely understood in consideration of the following detailed description of various embodiments of the invention in connection with the accompanying drawings, in which.

Figure 1:
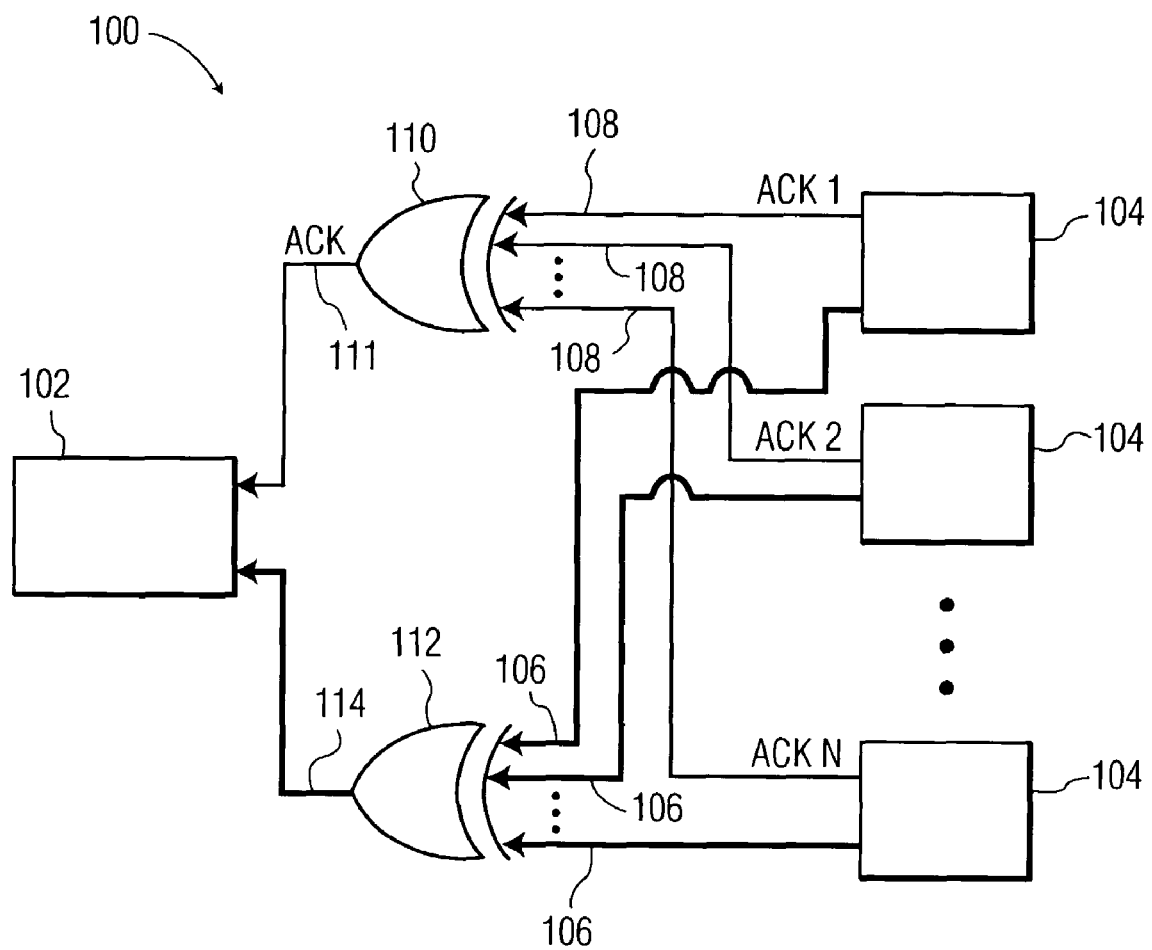
FIG. 1 is a block diagram of an example data communication arrangement between a controller module and a plurality of target modules, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

The present invention is believed to be generally applicable to methods and arrangements for transferring data between modules. The invention has been found to be particularly advantageous for transferring data between modules that reside in different clock domains. Examples of such applications include, among others, system on-chip using a controller in one clock domain that communicates with multiple integrated peripherals that can each potentially reside in a distinct clock domain, and high-speed communication between integrated circuits that can be situated on one or more printed circuit boards. While the present invention is not necessarily limited to such applications, an appreciation of various aspects of the invention is best gained through a discussion of examples in such an environment.

According to one example embodiment of the present invention, a data communication arrangement has multiple targets that each provide an acknowledgment signal and a data bus. Each target uses a transition of the respective acknowledgment signal to indicate the availability of data on the respective data bus. An exclusive-or function of all the acknowledgment signals generates a global acknowledgment signal, and a transition on one of the acknowledgment signals for a target propagates to an associated transition on the global acknowledgment signal. Each target encodes data on the data bus with a parallel exclusive-or between the data from the target and the previous encoded data. A parallel exclusive-or function of all the data buses generates a global data bus. A controller determines the availability of data on the global data bus by observing a transition in the global acknowledgment signal. The controller decodes the data from the global data bus by a parallel exclusive-or between the current and previous value of the global data bus. The controller indicates acceptance of the data, and possibly provides a subsequent access request, by toggling a request signal corresponding to the target.

Various embodiments of the invention permit data transfer in a manner similar to a parallel bus interface between a controller module and multiple target modules, while permitting efficient data transfer using a two-phase transfer protocol. The two-phase transfer protocol eliminates two recovery phases, which do not transfer data, from the prior four-phase transfer protocol. Data transfer occurs efficiently because after a data transfer using the two-phase protocol another transfer can immediately occur by repeating the two phases of the two-phase protocol instead of the recovery phases of the prior four-phase protocol. Elimination of the recovery phases can also reduce the power required for a data transfer because signal switching is eliminated that is associated with returning the data bus to a default value, as is typically implemented during the recovery phase in the prior four-phase transfer protocol. The two alternating phases of the two-phase protocol are a request phase, which may acknowledge acceptance of the result for a prior request, and an acknowledgment phase. The controller module and each of the target modules can reside in separate clock domains.

Referring to FIG. 1, a block diagram is shown for an example data communication arrangement 100 between a controller module 102 and a plurality of target modules 104, according to the present invention. The controller module 102 can request data from any one of the target modules 104. Typically, the controller module 102 does not simultaneously overlap multiple requests to the target modules 104.

Upon a target module 104 obtaining data to send to the controller module 102, such as the data to satisfy a read request from the controller module 102, the target module 104 sends the data to the controller module 102 via a corresponding data bus on a line 106. In one embodiment, the data sent by a target module 104 to the controller module 102 via a corresponding data bus on a line 106 can be encoded as is later described in detail. Together with sending the data via a corresponding data bus on a line 106, a target module 104 modifies the current value of a corresponding acknowledge signal on a line 108 to indicate that valid data is available. The modification of an acknowledge signal on a line 108 by a target module 104 can be a toggling of the value of the acknowledge signal on the line 108. Thus, either a low to high or a high-to-low transition of an acknowledge signal on a line 108 can indicate that data is available from the corresponding target module 104 on the corresponding data bus on a line 106.

A target module 104 does not modify the value of the corresponding acknowledge signal on a line 108 unless the target module 104 is indicating that data is available. A target module 104 does not modify the value of the corresponding data bus on a line 106 unless the target module 104 is sending data to the controller module 102.

An exclusive-or function 110 generates the exclusive-or of all the acknowledge signals on lines 108 to produce the global acknowledge signal on line 111. The exclusive- or function 110 has the property that a transition on any one of the acknowledge signals on a line 108 is propagated to a transition on the global acknowledge signal on line 111. Thus, the bus controller 102 can determine from a transition of the global acknowledge signal on line 111 that a target 104 is indicating that data is available on a corresponding data bus on a line 106.

A parallel exclusive-or function 112 generates the global data bus on line 114 from all the data busses on lines 106. Typically, the data busses on lines 106 and the global data bus on line 114 have identical bit widths of one or more signals. The parallel exclusive-or function 112 generates each bit of the global data bus on line 114 from an exclusive-or of a corresponding bit from the data busses on lines 106, for example, the least significant bit of the global data bus on line 114 is generated from an exclusive-or of the least significant bit from each of the data busses on lines 106.

The parallel exclusive-or function 112 has the property that any modification of a data bus on a line 106 is propagated to a modification of the global data bus on line 114. While the data sent by a target module 104 is not generally transferred unmodified from a target module 104 to the controller module 102, the modification observed on the global data bus 114 by the controller module 102 may be used to determine the data value sent by the target module 104 on a data bus on a line 106 as is later discussed in detail.

While the data communication arrangement 100 is typically used for binary logic systems, it will be appreciated that the data communication arrangement 100 can be used for other logic systems, such as ternary logic systems.

It should be understood that the elements described in FIG. 1 are for description only, to aid in the understanding of the present invention. As is known in the art, elements described as hardware may equivalently be implemented in software. Reference to specific electronic circuitry is also only to aid in the understanding of the present invention, and any circuit to perform essentially the same function is to be considered an equivalent circuit.

Figure 2:
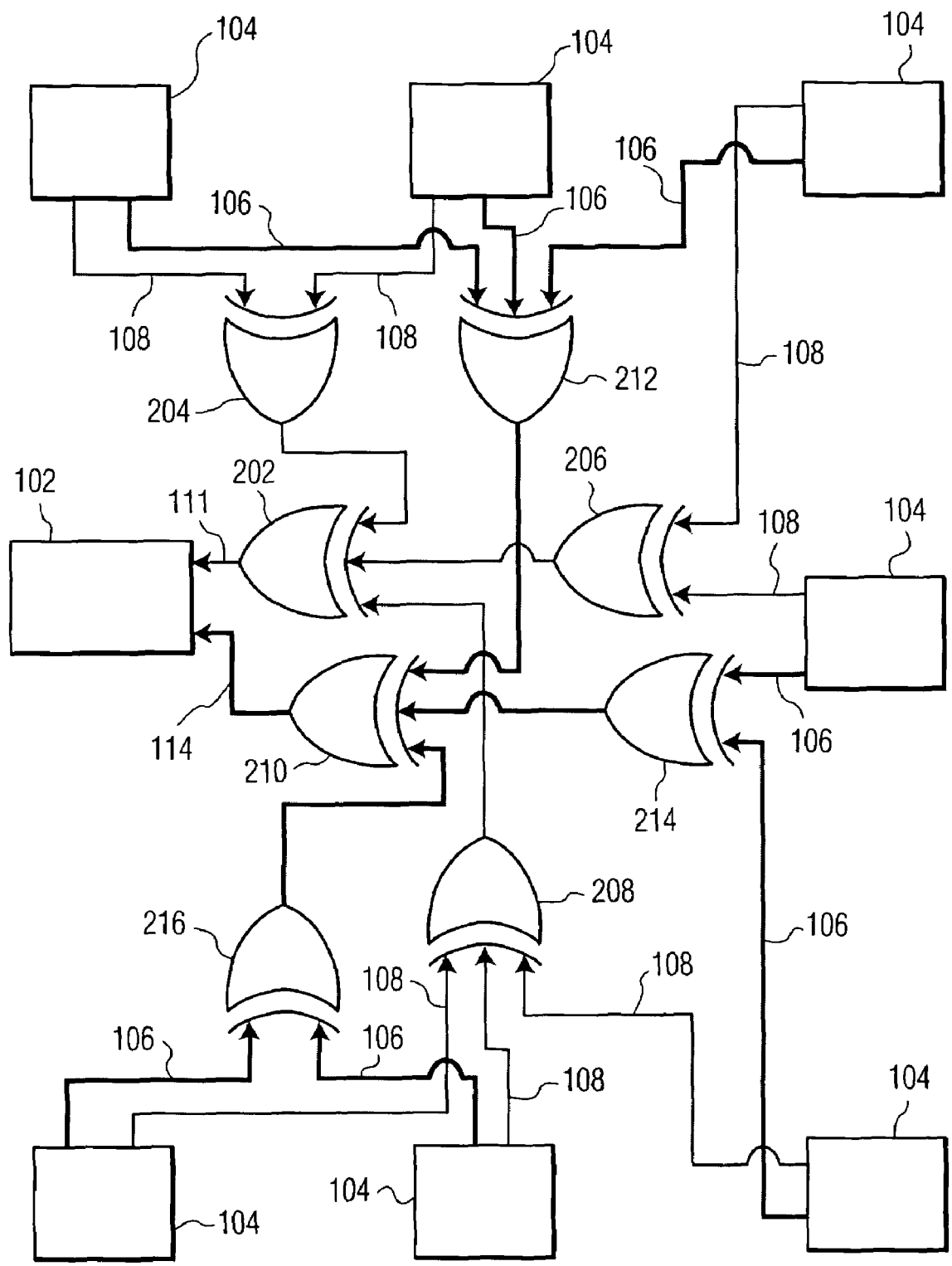
FIG. 2 is a block diagram of an example data communication arrangement illustrating distributed exclusive-or trees, according to the present invention.

Referring to FIG. 2, a block diagram is shown of an example data communication arrangement illustrating distributed exclusive-or trees, according to the present invention. A controller module 102 communicates data with multiple target modules 104. XOR gates 202, 204, 206, and 208 form an XOR tree and collectively correspond to exclusive-or function 110 of FIG. 1. XOR gates 210, 212, 214, and 216 form an XOR tree and collectively correspond to exclusive-or function 112 of FIG. 1. The XOR tree formed by XOR gates 202, 204, 206, and 208 generates the global acknowledge signal on line 111 from the acknowledge signals on lines 108 of the target modules 104. The XOR tree formed by XOR gates 210, 212, 214, and 216 generates the global data bus on line 114 from the data buses on lines 106 of the target modules 104.

An XOR tree, such as the XOR tree formed by XOR gates 202, 204, 206, and 208, can have a number of arrangements as long as the overall function of the tree produces an output, such as the global acknowledge signal on line 111, that is the exclusive-or of the inputs, such as the acknowledge signals on lines 108. The individual bits of the global data bus on line 114 can each have a XOR tree with a distinct arrangement.

Each XOR tree can have a distributed arrangement selected to reduce the wiring required to implement the XOR tree. For example, the placement of modules 102 and 104 in FIG. 2 can roughly correspond to the physical placement of the modules 102 and 104 on an integrated circuit, and a first level of clustering of the modules 102 and 104 based on adjacent physical locations can be used to produce a first level of an XOR tree, such as is shown for a first level of XOR gates 204, 206, and 208. Physical clustering of modules can be used at each level of an XOR tree. The wiring required can be significantly reduced, especially when there are a large number of target modules 104. A distributed XOR tree also can eliminate long signal lines on an integrated circuit or other system, thereby eliminating excessive propagation delays that can be associated with long signal lines.

Figure 3:
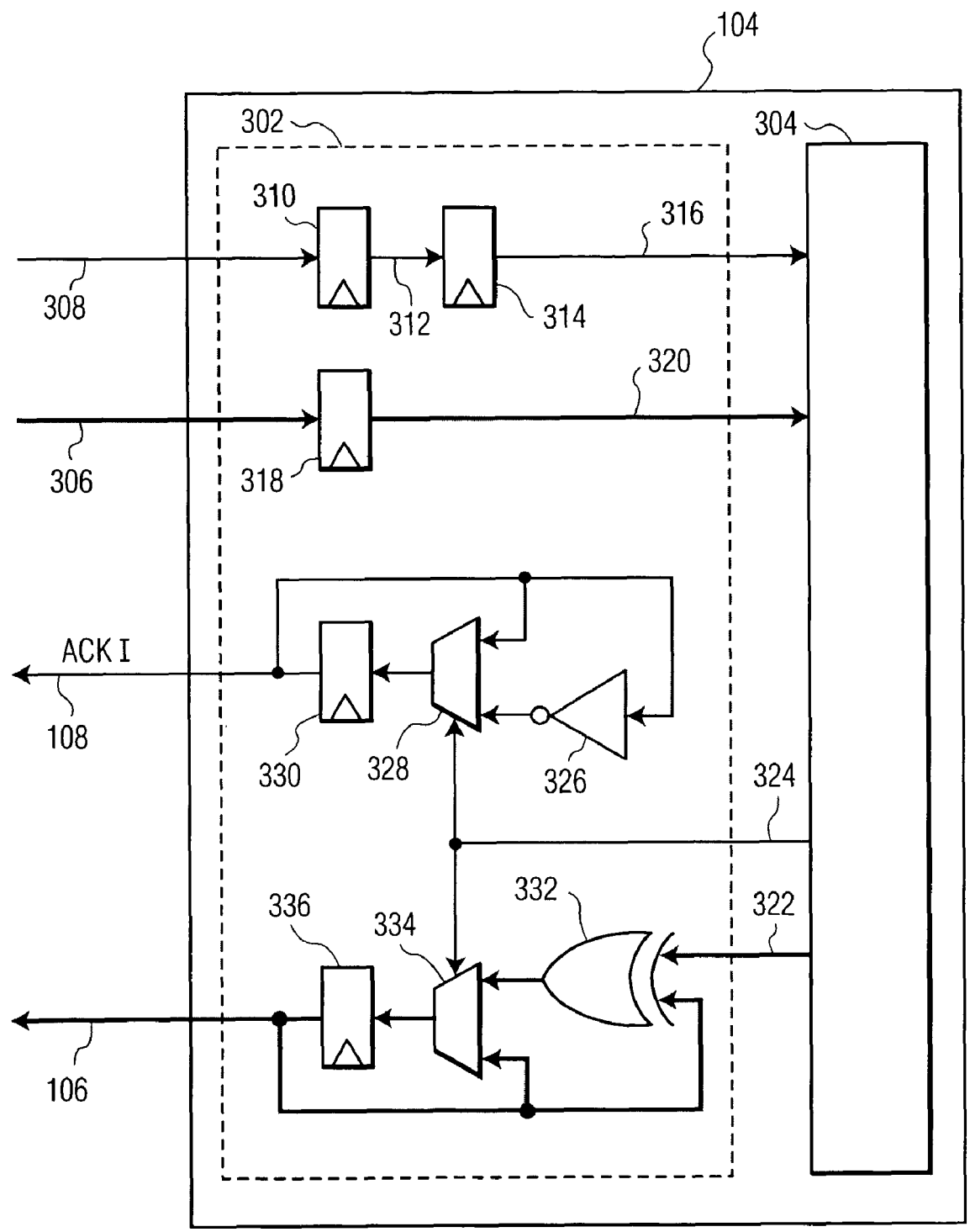
FIG. 3 is a block diagram of an example target module, according to the present invention.

Referring to FIG. 3, a block diagram is shown of an example target module 104, according to the present invention. A target module 104 includes a target interface 302 used to interface target logic 304 of the target module 104 with the controller module (not shown).

The controller module can provide an access request to the target module 104 on the access bus on line 306. The request signal on line 308 can be used to indicate that a valid access request is on the access bus on line 306, and can also be used to indicate that a result from the target module 104 for the previous access request was accepted by the controller module. A no-operation (NOP) access request can be used to indicate acceptance of the result for the previous access request without indicating an additional access request that requires processing by the target module 104. A modification, such as a toggling, of the request signal on line 308 can be used to indicate availability of an access request on the access bus on line 306, and can also be used to indicate acceptance by the controller module of the result for the previous access request.

The target module 104 and the controller module can operate in different clock domains, such that synchronization is required for communication between the target module 104 and the controller module. A first register 310 may sample the request signal on line 308 based on the local clock of the target module 104. Since the respective clocks of the controller module and the target module 104 may not be synchronized, the first register 310 can sample the request signal on line 308 during a transition of the request signal on line 308. Thus, signal 312 can have an undefined meta-stable value immediately after the sampling by the first register 310. Generally, any meta stability of signal 312 is resolved by first register 310 before being sampled by the second register 314, and thus registers 310 and 314 synchronize the request signal on line 308 with the local clock of the target module 104. Typically, the second register (or flip flop) 314 is used only if the target module and controller module are in different clock domains; in an alternative embodiment, where the target is in the same domain as the controller, this second register 314 is bypassed.

Because the controller module provides the transition of the request signal on line 308 together with the corresponding access request on the access bus on line 306, a transition on the synchronized request signal on line 316 is not recognized by target logic 304 unless the access bus on line 306 has had a stable value for at least one clock cycle of the local clock of the target module 104. Thus, register 318 samples and provides a stable value on line 320 whenever the synchronized request signal on line 316 has a transition. When the synchronized request signal on line 316 does not have a transition an access request on line 320 may have a meta stable value and this potentially meta-stable value should be ignored by the target logic 304.

An access request provided on the access bus on line 306 can be a read access to a memory or other location, such as an I/O location, associated with the target 104. After obtaining the data associated with the read access, the target logic 304 may provide the data on line 322 and assert the update signal on line 324 for a single clock cycle of the target 104 clock. The inverter 326, multiplexer 328, and register 330 transform the pulse for the update signal on line 324 into an acknowledge transition on line 108 that is propagated to the controller module via an XOR tree, such as exclusive-or function 110 of FIG. 1. The XOR gate 332, multiplexer 334 and register 336 encode the data associated with the read access on line 322. The encoded data has a transition on a bit of the data bus on line 106 for a corresponding bit of the data on line 322 having a value of one, and the encoded data does not have a transition on a bit of the data bus on line 106 for the corresponding bit of the data on line 322 having a value of zero.

It will be appreciated that a bit of the encoded data on line 106 can instead have a transition for the data on line 322 having a value of zero and not have a transition for the data on line 322 having a value of one. In another embodiment, the XOR gate 332 and multiplexer 334 are omitted and the data on line 322 is not encoded by being sent directly to register 336.

In one embodiment, each write access is posted at target 104 and is not acknowledged by target 104. In another embodiment, some or all write accesses are acknowledged by the target logic 304 asserting the update signal on line 324 for a single cycle while providing a default data value on line 322. The acknowledge of some or all write accesses can be used for flow control or ordering purposes. The request signal on line 308 can indicate the acceptance of read data by the controller module for a prior read access or the acceptance of the completion of a write by the controller module for a prior write access.

Figure 4:
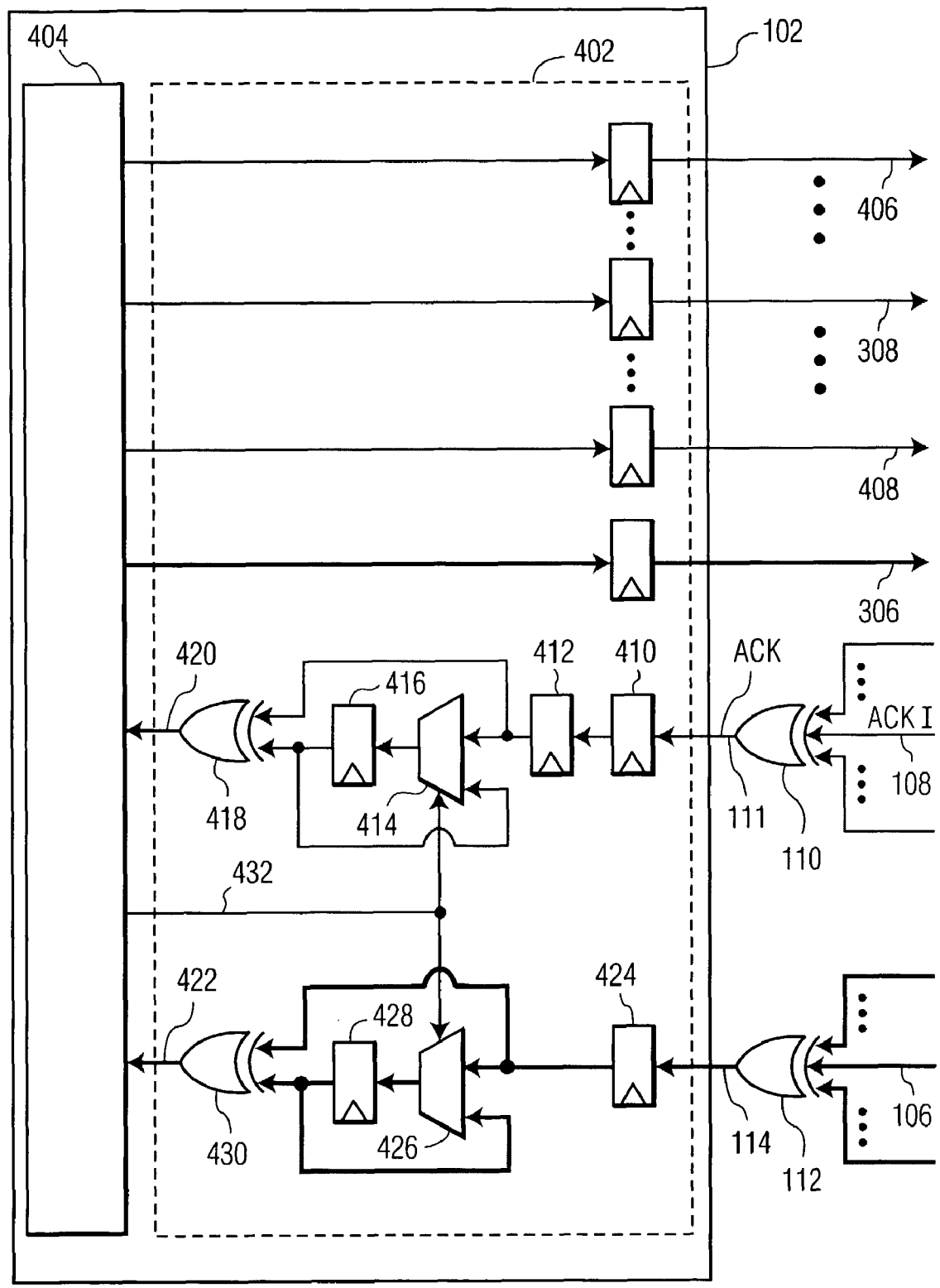
FIG. 4 is a block diagram of an example controller module, according to the present invention.

Referring to FIG. 4, a block diagram is shown of an example controller module 102, according to the present invention. The controller module 102 includes a controller interface 402 used to interface controller logic 404 of the controller module 102 with the target modules (not shown).

The controller module 102 can have an access bus on line 306 that is coupled to all of the target modules. The controller module 102 can have a separate request signal on lines 406, 308, and 408 for each of the target modules. The respective request signal on lines 406, 308, and 408 is can be used to indicate the availability of an access request on the access bus on line 306 that is designated for the corresponding target module, and can be used to indicate the acceptance of the results of a prior access request from the corresponding target module. In another embodiment, there is only one request signal on line 308, and the access bus on line 306 includes information identifying the target module, such as an address with the address space partitioned between the target modules, or a tag specifying the target module.

The exclusive-or function 110 performs the exclusive-or of all the acknowledge signals 108 from the target modules to produce the global acknowledge signal on line 111. The controller module 102 has registers 410 and 412 to synchronize the global acknowledge signal on line 111 with the local clock of the controller module 102. As with the illustration of FIG. 3, the second register 412 is used only if the target module and controller module are in different clock domains; in an alternative embodiment, where the target is in the same domain as the controller, this second register 412 is bypassed.

Multiplexer 414, register 416, and XOR gate 418 produce an asserted value on line 420 after an acknowledge transition occurs on global acknowledge signal on line 111 due to an acknowledge transition on a line 108 from one of the target modules. The controller logic 404, on observing an asserted value on line 420, can subsequently sample decoded data on line 422. The target module transfers the encoded data on line 106 together with the transition of the acknowledge signal on line 108. Thus, the decoded data on line 422 has a stable value because the global data bus on line 114 has been stable for at least one local clock cycle of the controller module 102 whenever an asserted value is observed on line 420 by the controller logic 404.

Changes of the value of a data bus 106 from a target module are propagated to corresponding changes in the value of the global data bus 114 by exclusive-or function 112, and then captured by register 424. Multiplexer 426, register 428, and XOR gate 430 decode a change in the value of the global data bus 114 into decoded data on line 422 that corresponds to the data that was encoded by the target module. After sampling the decoded data on line 422, the controller logic 404 can assert the sample signal on line 432 for a single cycle of the local clock of controller module 102.

The pulse of the sample signal on line 432 causes register 416 to be updated via multiplexer 414 with the current level of the global acknowledge signal on line 111, such that XOR gate 418 de-asserts the value on line 420 until a subsequent transition of the global acknowledge signal on line 111. The pulse of the sample signal on line 432 causes register 428 to be updated with the current value of register 424 reflecting the current value of the global data bus on line 114. The updating of register 428 enables XOR gate 430 to convert subsequent transitions within the encoded value of the global data bus on line 114 into a decoded value on line 422. During decoding, a bit with a transition is converted into a value of one, and a bit lacking of a transition is converted into a value of zero.

In another embodiment, the target modules do not encode data on the data bus on line 106, and the controller module 102 maintains, for each target module, a register storing a copy of the current data value driven by the target module. Transitions observed on the global data bus on line 114 are used to update the value of the register corresponding to the particular target module. A bit with a transition observed on the global data bus on line 114 causes the corresponding bit in the register corresponding to the particular target module to be complemented. A bit without a transition observed on the global data bus on line 114 causes the corresponding bit in the register corresponding to the particular target module to remain unmodified.

Figure 5:
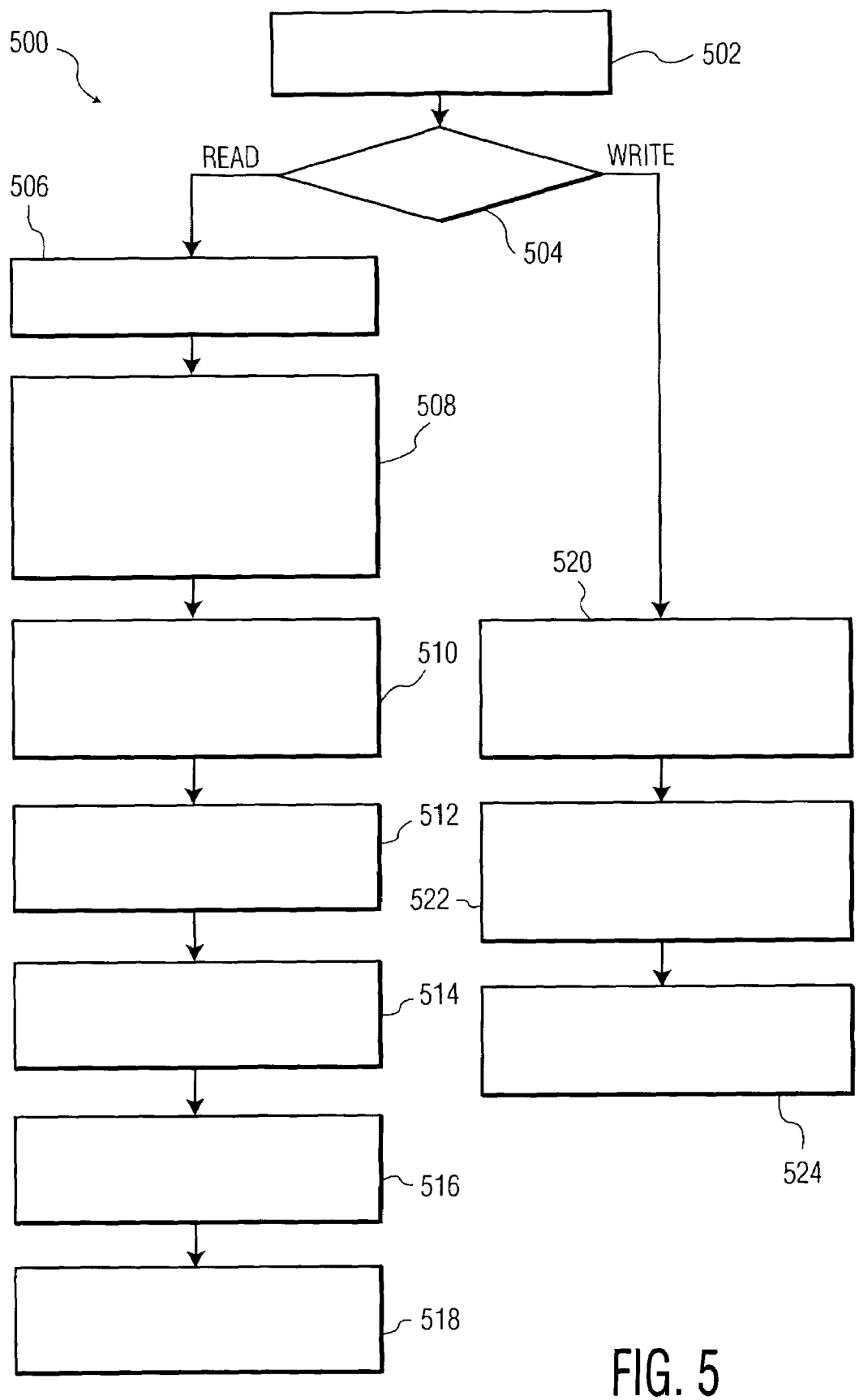
FIG. 5 is a flow diagram of an example process for data communication between a controller module and a plurality of target modules, according to the present invention.

Referring to FIG. 5, a flow diagram is shown of an example process 500 for data communication between a controller module and a plurality of target modules, according to the present invention. At step 502, a controller module produces an access, such as a read access or a write access, which identifies a particular target module. The target module may be identified, for example, by an access address included in the access that corresponds to a particular target module via an address map, a tag included in the access that identifies a particular target module, or by asserting an individual strobe signal, such as a request signal, corresponding to a particular target module. For a read access the process 500 proceeds from decision 504 to step 506, and for a write access the process 500 proceeds from decision 504 to step 520.

At step 506, the identified target obtains the data to satisfy the read access from a location associated with the read access. The data is encoded, at step 508, by the identified target module with a parallel exclusive-or between the data and the previously encoded data for the identified target module. Target modules other than the identified target module do not modify their respective encoded data. At step 510, an acknowledge signal for the identified target module is toggled to indicate the availability of the encoded data for the read access, while acknowledge signals for target modules other than the identified target module remain unmodified.

A global acknowledge signal is generated by an exclusive-or of the acknowledge signals from each of the target modules, at step 512. At step 514, the availability of the encoded data for the read access is determined from a toggling of the global acknowledge signal. A global data bus is generated by a parallel exclusive-or of a data bus from each of the target modules, at step 516. At step 518, the read data is decoded from the current and previous values of the global data bus by a parallel exclusive or between the current and previous values of the global data bus.

For a certain write access, a completion can be generated for the write access by the identified target module. At step 520, the completion of the write access is indicated by toggling the acknowledge signal for the identified target module, while acknowledge signals for target modules other than the identified target module remain unmodified. A global acknowledge signal is generated by an exclusive-or of the acknowledge signals from each of the target modules, at step 522. At step 524, the completion of the write access is determined from a toggling of the global acknowledge signal.

It will be appreciated that these data communication arrangements and approaches are not limited to synchronous (clocked) designs, but are also applicable to fully asynchronous implementations as well. Such application is apparent when considering one or more of the above illustrated embodiments, for example, with use of fully asynchronous communication protocol in which no clocks are included on either the controller module or the target module. Such protocols are illustrated and described in AMULET3: A 100 MIPS Asynchronous Embedded Processor, Furber, S. B.; Edwards, D. A.; Garside, J. D.; Computer Design, 2000 International Conference on Sep. 17-20, 2000, pp. 329-334; and A Fully Asynchronous Digital Signal Processor Using Self-timed Circuits, Jacobs, G. M.; Brodersen, R. W., IEEE Journal of Solid-State Circuits, Vol. 25, No. 6, December 1990, pp 1526-1537 incorporated herein by reference (also attached hereto as Appendix A and Appendix B).

Accordingly, various embodiments have been described by way of the figures and/or discussion as example implementations of the present invention involving data communication between a controller module and multiple target modules. The present invention should not be considered limited to these particular example implementations. Various modifications, equivalent processes, as well as numerous structures to which the present invention may be applicable fall within the scope of the present invention. For example, multi-chip or single-chip arrangements can be implemented using similarly constructed interfaces for communication between the chip-set arrangements. Such variations may be considered as part of the claimed invention, as fairly set forth in the appended claims.

What is claimed is:

1. A data communication arrangement, comprising:
   a plurality of target modules;
   a first XOR tree arranged to provide a first data integrity-indicating signal, and respond to a respective second data integrity-indicating signal from each of the target modules;
   a second XOR tree arranged to provide a first data bus, and respond to a respective second data bus from each of the target modules; and
   a controller module adapted to determine availability of data on the first data bus in response to the first data integrity-indicating signal.

2. The data communication arrangement according to claim 1, wherein
   the first data bus includes at least one signal, and
   each second data bus includes a corresponding at least one signal.

3. The data communication arrangement of claim 1, wherein the controller module and the plurality of target modules communicate in a fully asynchronous mode.

4. The data communication arrangement according to claim 1, wherein
   the first data bus includes at least one signal,
   each second data bus includes a corresponding at least one signal,
   the first XOR tree is arranged to provide the first data integrity signal by an exclusive-or function of each second data integrity-indication signal, and
   the second XOR tree is arranged to provide, in parallel, each of the at least one signal of the first data bus by an exclusive-or function of a corresponding signal from each second data bus.

5. The data communication arrangement according to claim 1, wherein
   each of the target modules is adapted to indicate the availability of the data on the respective second data bus by a modification of a value of the respective second data integrity-indicating signal, and
   the controller module is further adapted to determine the availability of the data from a modification of a value of the first data integrity-indicating signal.

6. The data communication arrangement according to claim 5, wherein each of the target modules is further adapted to provide the data as encoded data on the respective second data bus by a parallel exclusive-or between the data and encoded data previously provided on the respective second data bus.

7. The data communication arrangement according to claim 6, wherein the controller module is further adapted to decode the data by a parallel exclusive-or between data from the first data bus and previous data from the first data bus.

8. The data communication arrangement according to claim 7, wherein each of the target modules is further adapted to indicate the availability of the data in response to a read access from the controller module.

9. The data communication arrangement according to claim 7, wherein
   the controller module is further arranged to provide a respective acknowledgment integrity-indicating signal to each of the target modules, and
   the controller module is further adapted to indicate acceptance of the data by a modification of a value of the respective acknowledgment integrity-indicating signal.

10. The data communication arrangement according to claim 9, wherein
    the controller module is further arranged to provide an access bus to each of the target modules, and
    the controller module is further adapted to provide a subsequent access on the access bus together with indicating the acceptance of the data.

11. The data communication arrangement according to claim 9, wherein
    the controller module is further arranged to include a synchronizer for the first data integrity-indicating signal, and
    each of the target modules is further arranged to include a synchronizer for the respective acknowledgment integrity-indicating signal.

12. A system for transferring data, comprising:
    a subsystem for producing a read operation identifying one of a plurality of target modules;
    a subsystem for producing a first data value associated with the read operation by the one of the plurality of target modules;
    a subsystem for generating a respective second data value by each of the target modules, wherein
    the second data value is modified for the one of the plurality of target modules by an exclusive-or operation between the first data value and a previous second data value, and
    the second data value is unmodified for the target modules besides the one of the plurality of target modules;
    a subsystem for generating a respective first validation value by each of the target modules, wherein
    the first validation value is modified for the one of the plurality of target modules, and
    the first validation value is unmodified for the target modules besides the one of the plurality of target modules;
    a subsystem for generating a second validation value from the first validation values using an exclusive-or operation;
    a subsystem for determining availability of the first data value from a modification of the second validation value;
    a subsystem for generating a third data value from the second data values using an exclusive-or operation; and
    a subsystem determining the first data value by an exclusive-or operation between the third data value and a previous third data value.

13. A system for transferring data, comprising:
    means for producing a read operation identifying one of a plurality of target modules;
    means for producing a first data value associated with the read operation by the one of the plurality of target modules;
    means for generating a respective second data value by each of the target modules, wherein the second data value is modified for the one of the plurality of target modules by an exclusive-or operation between the first data value and a previous second data value, and the second data value is unmodified for the target modules besides the one of the plurality of target modules;

means for generating a respective first validation value by each of the target modules, wherein the first validation value is modified for the one of the plurality of target modules, and the first validation value is unmodified for the target modules besides the one of the plurality of target modules;

means for generating a second validation value from the first validation values using an exclusive-or operation;

means for determining availability of the first data value from a modification of the second validation value;

means for generating a third data value from the second data values using an exclusive-or operation; and means for determining the first data value by an exclusive-or operation between the third data value and a previous third data value.

14. A method for transferring data, comprising:

producing a read operation identifying one of a plurality of target modules;

producing a first data value associated with the read operation by the one of the plurality of target modules;

generating a respective second data value by each of the target modules, wherein the second data value is modified for the one of the plurality of target modules by an exclusive-or operation between the first data value and a previous second data value, and the second data value is unmodified for the target modules besides the one of the plurality of target modules;

generating a respective first validation value by each of the target modules, wherein the first validation value is modified for the one of the plurality of target modules, and the first validation value is unmodified for the target modules besides the one of the plurality of target modules;

generating a second validation value from the first validation values using an exclusive-or operation;

determining availability of the first data value from a modification of the second validation value;

generating a third data value from the second data values using an exclusive-or operation; and determining the first data value by an exclusive-or operation between the third data value and a previous third data value.

15. A system for transferring data, comprising:

a subsystem for producing a write operation identifying one of a plurality of target modules;

a subsystem for generating a respective first validation value by each of the target modules, wherein the first validation value is modified for the one of the plurality of target modules, and the first validation value is unmodified for the target modules besides the one of the plurality of target modules;

a subsystem for generating a second validation value from the first validation values using an exclusive-or operation; and a subsystem for determining completion of the write operation from a modification of the second validation value.

16. A system for transferring data, comprising:

means for producing a write operation identifying one of a plurality of target modules;

means for generating a respective first validation value by each of the target modules, wherein the first validation value is modified for the one of the plurality of target modules, and the first validation value is unmodified for the target modules besides the one of the plurality of target modules;

means for generating a second validation value from the first validation values using an exclusive-or operation; and means for determining completion of the write operation from a modification of the second validation value.

17. A method for transferring data, comprising:

producing a write operation identifying one of a plurality of target modules;

generating a respective first validation value by each of the target modules, wherein the first validation value is modified for the one of the plurality of target modules, and the first validation value is unmodified for the target modules besides the one of the plurality of target modules;

generating a second validation value from the first validation values using an exclusive-or operation; and determining completion of the write operation from a modification of the second validation value.

* * * * *